United States Patent
Huo et al.

(10) Patent No.: US 10,884,414 B2
(45) Date of Patent: Jan. 5, 2021

(54) CONTROL METHOD AND APPARATUS FOR TURNING OFF A LIGHT SOURCE AFFECTING A PHOTOGRAPHING EFFECT

(71) Applicant: SZ DJI TECHNOLOGY CO., LTD., Shenzhen (CN)

(72) Inventors: Dajun Huo, Shenzhen (CN); Lei Liu, Shenzhen (CN); Yumian Deng, Shenzhen (CN); Zhaoliang Peng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/206,405

(22) Filed: Nov. 30, 2018

(65) Prior Publication Data

US 2019/0101920 A1    Apr. 4, 2019

Related U.S. Application Data

(63) Continuation of application No. PCT/CN2016/083983, filed on May 30, 2016.

(51) Int. Cl.
| | |
|---|---|
| *H04N 5/225* | (2006.01) |
| *H04N 5/235* | (2006.01) |
| *B64C 39/02* | (2006.01) |
| *G05D 1/00* | (2006.01) |
| *B64D 47/02* | (2006.01) |
| *B64D 47/08* | (2006.01) |
| *H04N 5/232* | (2006.01) |

(52) U.S. Cl.
CPC ......... *G05D 1/0094* (2013.01); *B64C 39/024* (2013.01); *B64D 47/02* (2013.01); *B64D 47/08* (2013.01); *H04N 5/2354* (2013.01); *H04N 5/23206* (2013.01); *B64C 2201/127* (2013.01)

(58) Field of Classification Search
CPC ............... G05D 1/0094; H04N 5/2354; H04N 5/23206; H04N 5/23203; B64D 47/08; B64D 47/02; B64C 39/024; B64C 2201/127
USPC ................................................... 348/144, 14
See application file for complete search history.

(56) References Cited

U.S. PATENT DOCUMENTS

| | | | |
|---|---|---|---|
| 7,630,014 B2 | 12/2009 | Pardikes | |
| 7,777,778 B2 * | 8/2010 | Scharenbroch | .... G06K 9/00604 348/78 |
| 10,086,956 B2 * | 10/2018 | O'Brien | ................. B64C 1/062 |

(Continued)

FOREIGN PATENT DOCUMENTS

| | | | |
|---|---|---|---|
| CN | 102056368 A | 5/2011 | |
| CN | 103425357 A | 12/2013 | |

(Continued)

OTHER PUBLICATIONS

The World Intellectual Property Organization (WIPO) International Search Report and Written Opinion for PCT/CN2016/083983 dated Mar. 1, 2017 7 pages.

*Primary Examiner* — Susan E. Hodges
(74) *Attorney, Agent, or Firm* — Anova Law Group, PLLC

(57) ABSTRACT

A mobile device control method includes receiving a photographing command, turning off, in response to the photographing command, a light source affecting a photographing effect, and performing a photographing operation according to the photographing command.

13 Claims, 12 Drawing Sheets

(56) References Cited

U.S. PATENT DOCUMENTS

| | | | | |
|---|---|---|---|---|
| 2006/0087582 A1* | 4/2006 | Scharenbroch | .... | G06K 9/00604 |
| | | | | 348/370 |
| 2010/0147948 A1* | 6/2010 | Powell | ............... | G06K 7/10732 |
| | | | | 235/455 |
| 2012/0038903 A1* | 2/2012 | Weimer | ................... | G01C 3/08 |
| | | | | 356/4.07 |
| 2015/0019047 A1 | 1/2015 | Chandrashekarappa et al. | | |

FOREIGN PATENT DOCUMENTS

| | | |
|---|---|---|
| CN | 104023179 A | 9/2014 |
| CN | 104144323 A | 11/2014 |
| CN | 104243785 A | 12/2014 |
| CN | 104410900 A | 3/2015 |
| CN | 105182664 A | 12/2015 |
| EP | 2713154 A1 | 4/2014 |
| JP | 201496000 A | 5/2014 |

\* cited by examiner

CONTROL METHOD AND APPARATUS FOR TURNING OFF A LIGHT SOURCE AFFECTING A PHOTOGRAPHING EFFECT

CROSS-REFERENCE TO RELATED APPLICATION

This application is a continuation application of International Application No. PCT/CN2016/083983, filed on May 30, 2016, the entire contents of which are incorporated herein by reference.

TECHNICAL FIELD

The present disclosure relates to photographing technology and, more particularly, to a mobile device, such as an unmanned aerial vehicle (UAV), a control method and apparatus thereof, a controller, a memory, a control terminal, and a photographing device.

BACKGROUND

Pilot lamps are generally provided on a fuselage of an unmanned aerial vehicle (UAV) and are configured to indicate the status of the UAV and/or distinguish the orientation of the UAV. However, the light emitted from the pilot lamps easily projects into a lens of a camera carried by the UAV, causing lens flare that interferes with the camera's exposure and affects the photographing effect.

Conventional technologies use a lens hood to prevent lens flare. However, the use of the lens hood does not completely prevent and merely alleviates lens flare. In addition, the material costs are increased. Because different lenses need different lens hoods, the manufacturer's maintenance cost is increased. The user experience is poor.

SUMMARY

In accordance with the disclosure, there is provided a mobile device control method includes receiving a photographing command, turning off, in response to the photographing command, a light source affecting a photographing effect, and performing a photographing operation according to the photographing command.

Also in accordance with the disclosure, there is provided a mobile device including a light source, a signal receiving apparatus, a control apparatus, and a photographing apparatus. The signal receiving apparatus is configured to receive a photographing command. The control apparatus is configured to turn off the light source in response to the photographing command. The photographing apparatus is communicatively connected to the control apparatus and is configured to perform a photographing operation according to the photographing command.

Also in accordance with the disclosure, there is provided an unmanned aerial vehicle (UAV) including a signal receiving apparatus, a photographing apparatus, a light signal, and a control apparatus. The signal receiving apparatus configured to receive a photographing command. The photographing apparatus configured to perform a photographing operation according to the photographing command. The light signal has an arrangement position or a light emitting range of the light source falling in a field of view of the photographing apparatus. The control apparatus is configured to turn off the light source.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Figure 1:
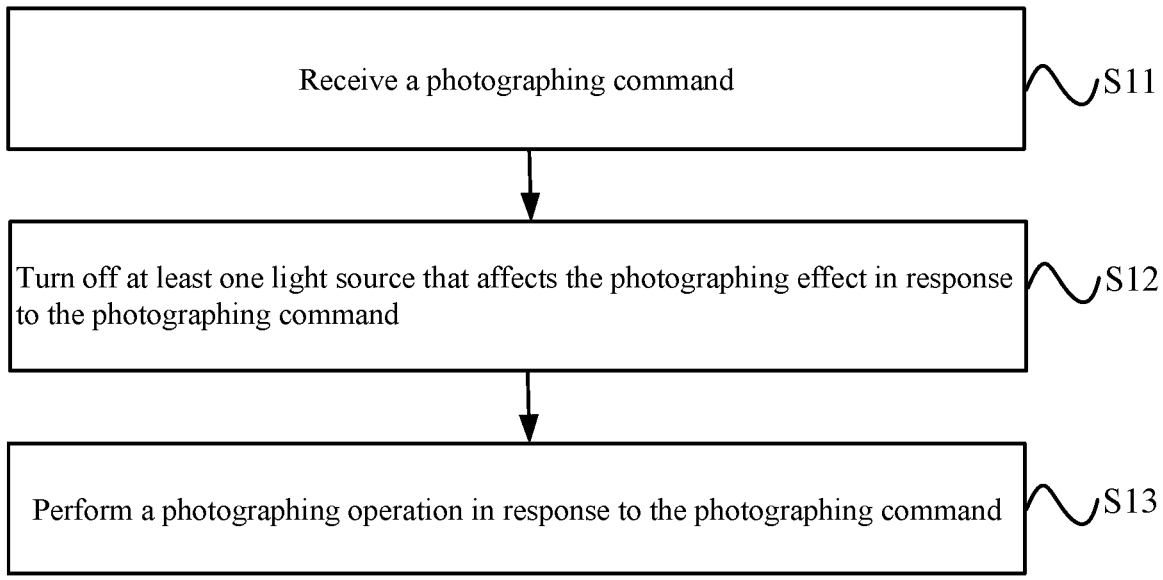
FIG. 1 is a flow chart of a mobile device control method according to an embodiment of the disclosure.

FIG. 1 is a flow chart of a mobile device control method consistent with the disclosure. As shown in FIG. 1, at S11, a photographing command is received.

In some embodiments, the photographing command inputted by a user via an input apparatus or sent by a control terminal via a wired or wireless communication connection can be received. The control terminal can be a remote controller for controlling the mobile device or another terminal device, such as a computer, a mobile phone, a tablet, or the like, which is installed with a program for controlling the mobile device.

At S12, at least one light source affecting a photographing effect is turned off in response to the photographing command.

The light source that affects photographing effect refers to the light source with an arrangement position or a light emitting range falling in the field of view (FOV) of a photographing apparatus. The light emitted from the light source can cause lens flare in the photographing apparatus. For example, for a quadcopter unmanned aerial vehicle (UAV), the lens and the nose of the UAV point toward almost a same direction, and hence the pilot lamps beneath two or one of the arms at the nose of the UAV can be turned off to prevent the lens flare.

At S13, a photographing operation is performed in response to the photographing command.

The photographing operation can include shooting an image or recording a video. The photographing operation including shooting an image is also referred to as an "image shooting operation" and the photographing operation including recording a video is also referred to as a "video recording operation."

In some embodiments, the executing entity of the method in FIG. 1 can include the mobile device that includes the photographing apparatus. The mobile device can be a UAV, a driverless boat, a self-drive car, or the like. In some embodiments, the executing entity can include one or more apparatuses/circuits of the mobile device. In some embodiments, the mobile device does not include a photographing apparatus but may, for example, carry a photographing device that is relatively independent from the mobile device (where such a photographing device may also be referred to as an "independent photographing device"). In these embodiments, the executing entity can include only the photographing device, or can include both the photographing device and the mobile device, in which situation the mobile device can implement the processes at S11 and S12 and the photographing device can implement the process at S13.

Figure 2:
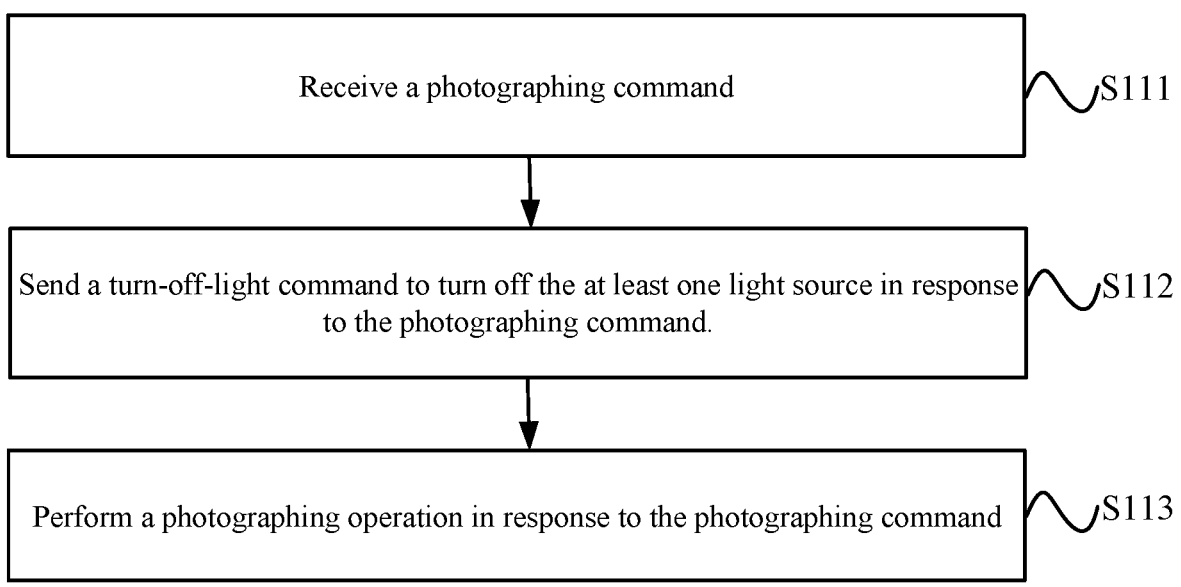
FIG. 2 is a flow chart of the mobile device control method in FIG. 1 according to an embodiment of the disclosure, when an executing entity includes a photographing apparatus.

FIG. 2 is a flow chart of the mobile device control method in FIG. 1 according to an example embodiment, in which the executing entity includes the photographing apparatus. As shown in FIG. 2, at S111, a photographing command is received.

The photographing command can be received from another apparatus/circuit of the mobile device, such as an input apparatus, a signal receiving apparatus, a control apparatus, or the like. The photographing command can also be received directly from a control terminal communicatively connected to the mobile device. Taking an UAV as an example of the mobile device, the photographing apparatus can directly receive the photographing command from a remote controller or can receive the photographing command from a control apparatus, such as a flight controller of the UAV or the like. In some embodiments, the photographing apparatus can receive the photographing command from the signal receiving apparatus of the UAV.

At S112, a turn-off-light command is sent to turn off at least one light source in response to the photographing command.

In some embodiments, the turn-off-light command can be sent to the control apparatus that controls the at least one light source, also referred to as a "light-source control apparatus", to turn off at least one light source. In some embodiments, if the photographing apparatus can directly control the at least one light source, the turn-off-light command can be sent directly to the photographing apparatus. For example, an apparatus that receives the photographing command, such as the photographing apparatus, the signal receiving apparatus, or the like, can send a signal to the light-source control apparatus, and the light-source control apparatus can send the turn-off-light command to turn off the at least one light source according to the received signal. The light-source control apparatus can also generate the turn-off-light command after directly receiving the photographing command and send the turn-off-light command to turn off the at least one light source.

At S113, a photographing operation is performed in response to the photographing command.

The photographing operation can include shooting an image or recording a video.

Figure 3:
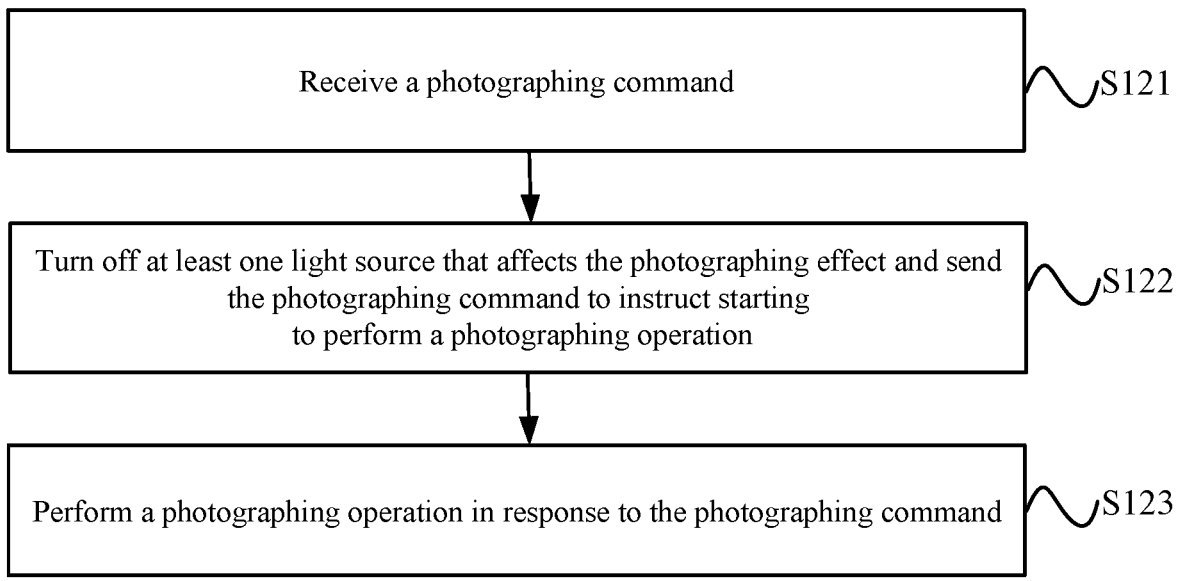
FIG. 3 is a flow chart of the mobile device control method in FIG. 1 according to an embodiment of the disclosure, when the executing entity includes a control apparatus and a photographing apparatus.

FIG. 3 is a flow chart of the mobile device control method in FIG. 1 according to another example embodiment, in which the executing entity includes the control apparatus and the photographing apparatus.

As shown in FIG. 3, at S121, a photographing command is received.

The executing entity of the process at S121 includes the control apparatus. The control apparatus can receive the photographing command from another apparatus/circuit of the mobile device, such as an input apparatus, a signal receiving apparatus, or the like, or can directly receive the photographing command from a control terminal communicatively connected to the mobile device.

At S122, at least one light source that affects the photographing effect is turned off, and the photographing command is sent to instruct starting to perform a photographing operation.

The executing entity of the process at S122 can include the control apparatus. After turning off the at least one light source, the control apparatus can send the photographing command to the photographing apparatus. Taking a UAV as an example of the mobile device, the control apparatus can include a flight controller, or another control component.

At S123, the photographing operation is performed in response to the photographing command.

The executing entity of the process at S123 can include the photographing apparatus.

In some embodiments, after the turn-off of the at least one light source is confirmed, the photographing operation can be performed. For example, the photographing operation can be performed, in response to a feedback message sent by the light-source control apparatus after turning off the at least one light source being received. The light-source control apparatus can be a controller, an electronic control unit (ECU), or a Micro Control Unit (MCU) of the mobile device. Herein, the at least one light source refer to at least one light source that are turned off in response to the photographing command and at least partially affect the photographing effect. Hereinafter, the definition of the at least one light source is the same unless otherwise specified. The photographing operation can be performed after the turn-off of the at least one light source is confirmed, such that no lens flare can be induced in the lens of the photographing apparatus by the at least one light source during the photographing process.

Taking a UAV as an example of the mobile device, the at least one light source can include the signal pilot lamps or other pilot lamps provided on a fuselage of the UAV.

In some other embodiments, after the process at S12 is implemented, the photographing operation can be performed immediately or can be performed after delaying for a third preset time.

According to the present disclosure, the at least one light source that affects the photographing effect can be turned off before the photographing operation is performed. As such, the lens flare caused by the at least one light source provided at the fuselage can be prevented without the use of a lens hood. The cost can be reduced and the versatility can be enhanced. Associating an operation of turning off the at least one light source, also referred to as a "turn-off-light operation", with the photographing operation can provide an automatic function for a user, such that the user does not need to manually turn off the at least one light source. The problem of lens flare can be solved without affecting the user experience.

Figure 4:
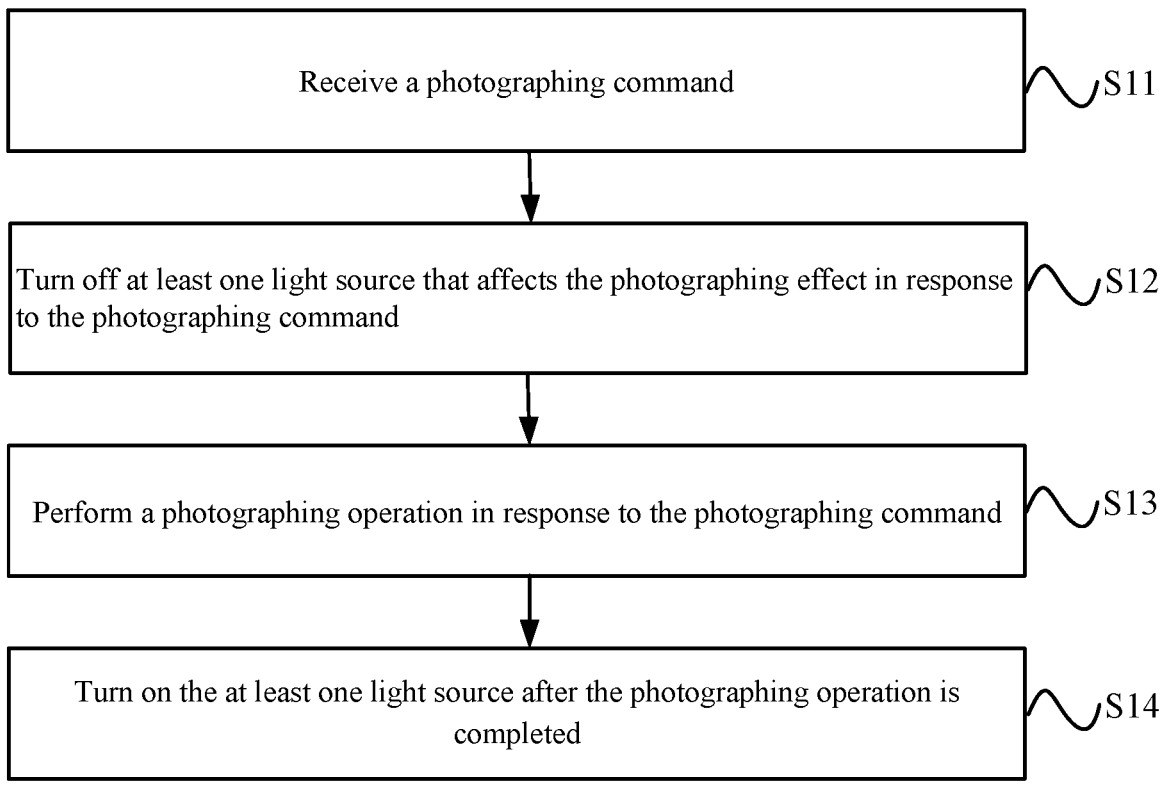
FIG. 4 is a flow chart of another mobile device control method according to an embodiment of the disclosure.

FIG. 4 is a flow chart of another mobile device control method consistent with the disclosure. The processes at S11 to S13 in FIG. 4 are the same as the processes at S11 to S13 in FIG. 1, and detailed description thereof is omitted here. As shown in FIG. 4, after the process at S13 is implemented, at S14, the at least one light source is turned on after the photographing operation is completed.

The executing entity of the process at S14 can include the mobile device or one or more apparatuses/circuits of the mobile device. When the mobile device does not include a photographing apparatus but may, for example, carry a photographing device that is relatively independent from the mobile device, the executing entity of the process at S14 can be the photographing apparatus.

In some embodiments, when the executing entity of the process at S14 includes the photographing device, the photographing apparatus of the mobile device, or the control apparatus for controlling photographing, also referred to as a "photographing control apparatus," a photographing status can be obtained directly. The at least one light source can be turned on directly or can be turned on by the light-source control apparatus.

In some embodiments, when the executing entity of the process at S14 includes one or more apparatuses/circuits other than the photographing apparatus or the photographing control apparatus, for example, the light-source control apparatus, a feedback message indicating the completion of the photographing operation, also referred to as a "photographing-completion feedback message," can be obtained from the photographing device, the photographing apparatus of the mobile device, or the photographing control apparatus to determine whether the photographing operation is completed. The at least one light source can be turned on after the completion of the photographing operation is determined. For example, after the completion of the photographing operation, a feedback command for turning on the at least one light source sent by the photographing device, the photographing apparatus of the mobile device, or the photographing control apparatus can be received, and the at least one light source can be turned on according to the feedback command. In some embodiments, when the executing entity of the process at S14 includes the photographing device, the photographing apparatus of the mobile device, or the control photographing control apparatus, the photographing-completion feedback message can be obtained to determine whether the photographing operation is completed.

In some embodiments, when the executing entity of the process at S14 includes one or more apparatuses/circuits other than the photographing apparatus or the photographing control apparatus, for example, the light-source control apparatus, the completion of the photographing operation can be determined based on a delay time. If the photographing command is shooting an image (such a photographing command is also referred to as an "image shooting command"), the photographing operation can be determined as having completed after a first preset time after the photographing operation is performed, and the at least one light source can be turned on. If the photographing command is recording a video (such a photographing command is also referred to as a "video recording command"), the photographing device, the photographing apparatus of the mobile device, or the photographing control apparatus can periodically send the turn-off-light command to the executing entity of the process at S14. If no turn-off-light command is received within a second preset time, the photographing operation can be determined as having completed and the at least one light source can be turned on. As such, a problem that the state of the at least one light source is remained to be off and cannot be restored due to the loss of state caused by a failure or restart can be prevented. After receiving a command for stopping the photographing operation, also referred to as a "stop-photographing command," the photographing apparatus, the photographing apparatus of the mobile device, or the photographing control apparatus can stop the recording process and stop sending the turn-off-light command. In some embodiments, when the executing entity of the process at S14 includes the photographing device, the photographing apparatus of the mobile device, or the control photographing control apparatus, the completion of the photographing can also be determined according to the delay time.

According to the present disclosure, the at least one light source can be turned on automatically after the completion of the photographing operation, such that the at least one light source can be restored to work and the user does not need to manually turn on the at least one light source.

Figure 5:
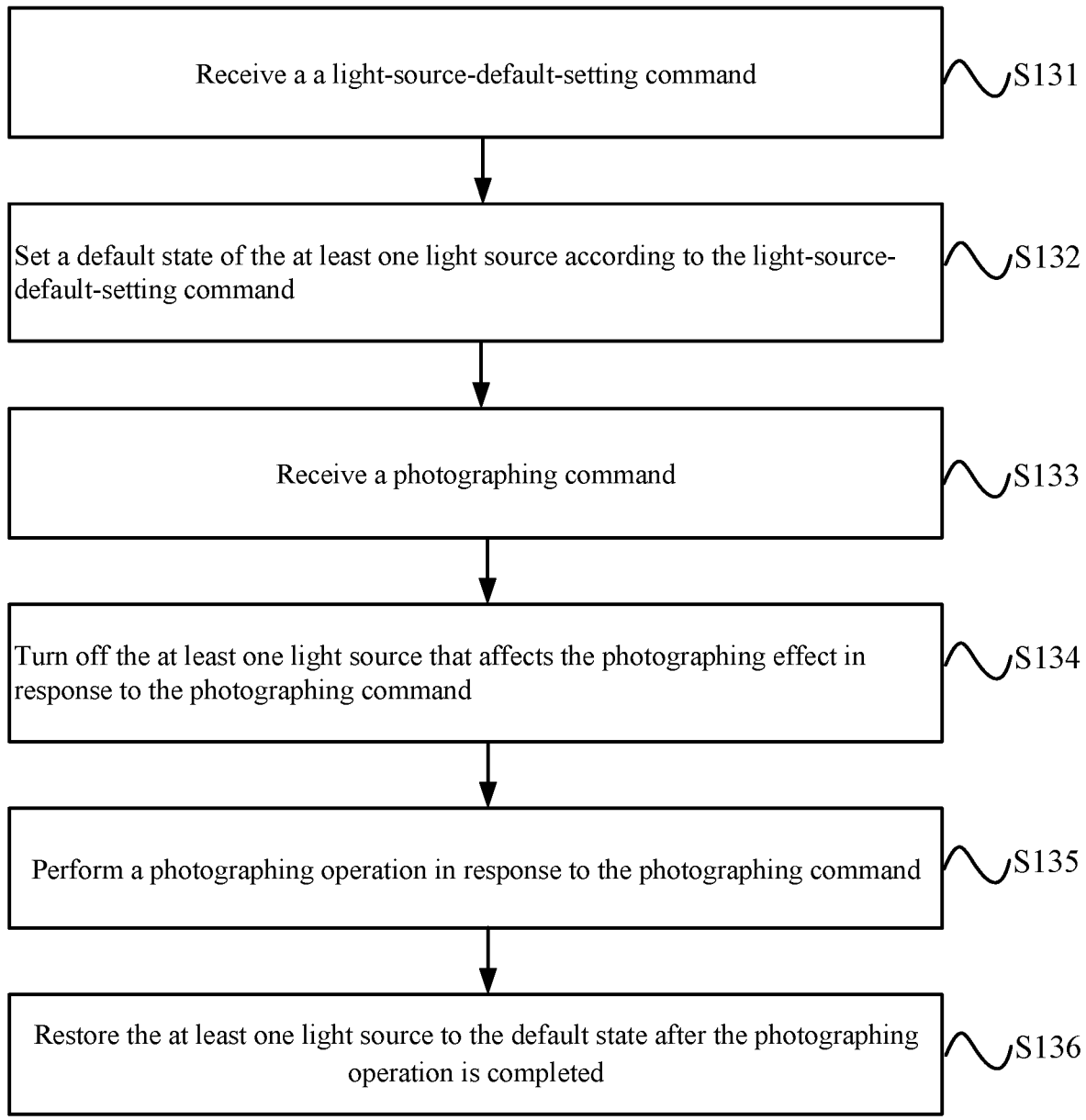
FIG. 5 is a flow chart of another mobile device control method according to an embodiment of the disclosure.

FIG. 5 shows a flow chart of another mobile device control method consistent with the disclosure. The processes at S133 to S135 in FIG. 5 are similar to the processes at S11 to S13 in FIG. 1, and detailed description thereof is omitted here. The executing entity of the control method in FIG. 5 can include the mobile device or one or more apparatuses/circuits of the mobile device. When the mobile device does not include a photographing apparatus but may, for example, carry a photographing device that is relatively independent from the mobile device, the executing entity can include the photographing device. The exemplary mobile device control method in FIG. 5 can be combined with any one of the above-described exemplary mobile device control methods.

As shown in FIG. 5, at S131, a command for setting a default state of the at least one light source, also referred to as a "light-source-default-setting command," is received.

The light-source-default-setting command can be inputted by a user via an input apparatus or can be sent by a control terminal, such as a remote controller or an application program (APP), via a wired or wireless communication connection. The default state of the at least one light source can at least include an open state and a close state. In some embodiments, the default state of the at least one light source can also include different colors of the at least one light source, different brightness of the at least one light source, or the like.

At S132, the default state of the at least one light source is set according to the light-source-default-setting command.

At S133, a photographing command is received.

At S134, the at least one light source that affects the photographing effect is turned off in response to the photographing command.

At S135, a photographing operation is performed in response to the photographing command.

At S136, the at least one light source is restored to the default state after the photographing operation is completed.

In some embodiments, when the executing entity of the process at S136 includes the photographing device, the photographing apparatus of the mobile device, or the photographing control apparatus, the photographing status can be obtained directly. The at least one light source can be restored to the default state directly or can be restored to the default state through the control of the light-source control apparatus.

In some embodiments, when the executing entity of the process at S136 includes one or more apparatuses/circuits other than the photographing apparatus or the photographing control apparatus, for example, the light-source control apparatus, the photographing-completion feedback message can be obtained from the photographing device, the photographing apparatus of the mobile device, or the photographing control apparatus, to determine whether the photographing operation is completed. The at least one light source can be restored to the default state after the completion of the photographing operation is determined. For example, after the completion of the photographing operation, the photographing-completion feedback message sent by the photographing device, the photographing apparatus of the mobile device, or the photographing control apparatus, can be received, and the at least one light source can be restored to the default state according to the feedback command. In some embodiments, when the executing entity of the process at S136 includes the photographing device, the photographing apparatus of the mobile device, or the control photographing control apparatus, the photographing-completion feedback message can be also obtained to determine whether the photographing operation is completed.

In some embodiments, when the executing entity of the process at S136 includes one or more apparatuses/circuits other than the photographing apparatus or the photographing control apparatus, for example, the light-source control apparatus, the completion of the photographing operation can be determined according to the delay time. If the photographing command is shooting an image, the photographing operation can be determined as having completed after a preset time after the photographing operation is performed, and the at least one light source can be restored to the default state. If the photographing command is recording a video, the photographing device, the photographing apparatus of the mobile device, or the photographing control apparatus can periodically send the turn-off-light command to the executing entity. If no turn-off-light command is received within a preset time, the photographing operation can be determined as having completed and the at least one light source can be restored to the default state. As such, a problem that the state of the at least one light source is remained to be off and cannot be restored due to the loss of state caused by a failure or restart can be prevented. After receiving a command for stopping the photographing operation, also referred to as a "stop-photographing command", the photographing device, the photographing apparatus of the mobile device, or the photographing control apparatus can stop the recording process and stop sending the turn-off-light command. In some embodiments, when the executing entity includes the photographing device, the photographing apparatus of the mobile device, or the control photographing control apparatus, the completion of the photographing can also be determined according to the delay time.

According to the disclosure, the at least one light source can be restored to the default state after the completion of the photographing operation, such that the at least one light source can be restored to work according to the preset default state and the user does not need to manually restore the at least one light source to the preset default state.

Figure 6:
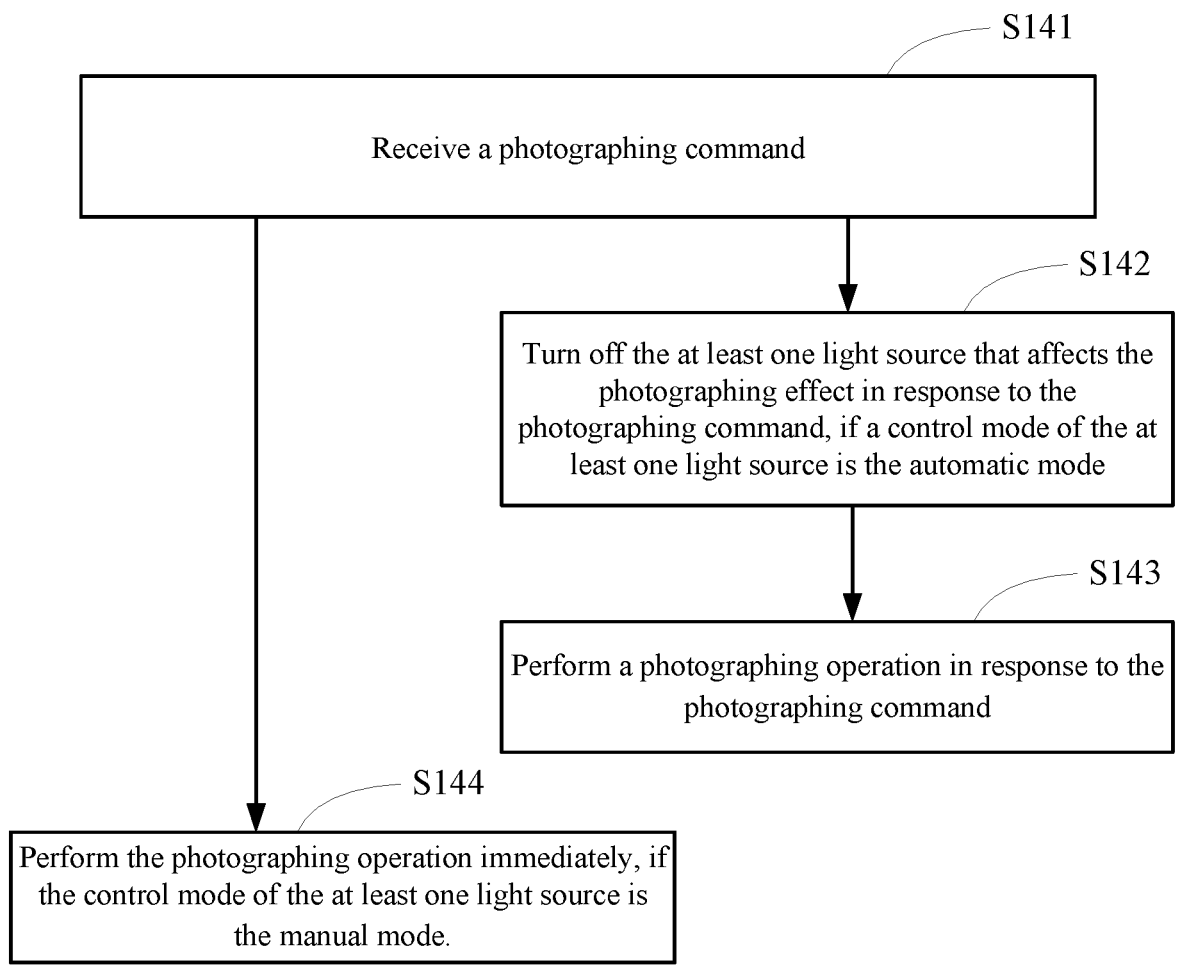
FIG. 6 is a flow chart of another mobile device control method according to an embodiment of the disclosure.

FIG. 6 shows a flow chart of another mobile device control method consistent with the disclosure. The processes at S141 and S143 in FIG. 6 are similar to the processes at S11 and S13 in FIG. 1, and detailed description thereof is omitted here. The exemplary mobile device control method in FIG. 6 can be combined with any one of the above-described exemplary mobile device control methods.

As shown in FIG. 6, at S141, a photographing command is received.

A control mode of the at least one light source can be determined. If the control mode of the at least one light source is an automatic mode, the process proceeds to S142. If the control mode of the at least one light source is a manual mode, the process proceeds to S144.

At S142, if the control mode of the at least one light source is the automatic mode, the at least one light source that affects the photographing effect is turned off in response to the photographing command.

The executing entity of the process at S142 can include the mobile device or one or more apparatuses/circuits of the mobile device. When the mobile device does not include a photographing apparatus but may, for example, carry a photographing device that is relatively independent from the mobile device, the executing entity of the process at S142 can include the photographing device.

At S143, a photographing operation is performed in response to the photographing command.

The processes complete.

At S144, if the control mode of the at least one light source is the manual mode, the photographing operation is performed immediately.

The processes complete.

Figure 7:
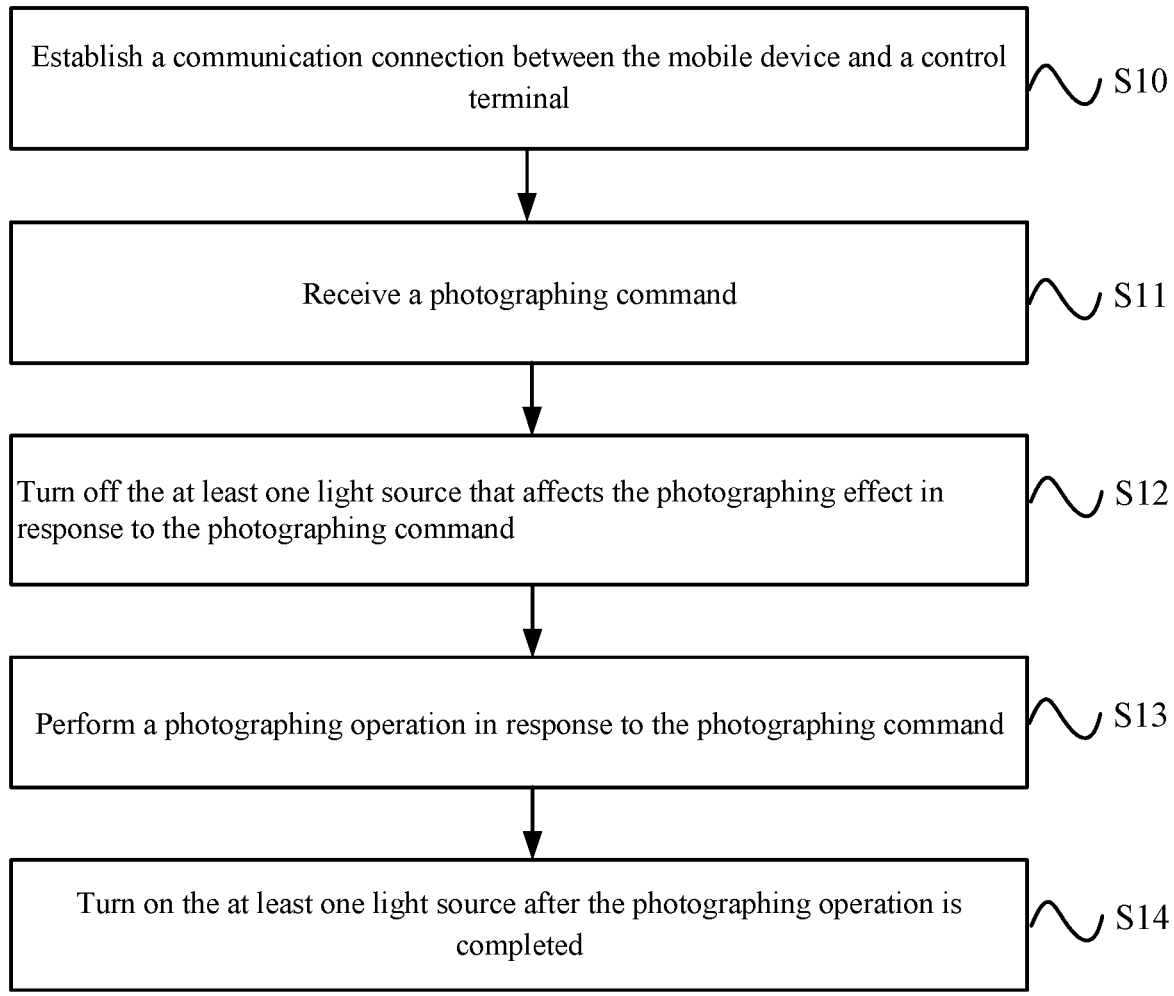
FIG. 7 is a flow chart of another mobile device control method according to an embodiment of the disclosure.

FIG. 7 shows a flow chart of another mobile device control method consistent with the disclosure. The processes at S11 to S14 in FIG. 7 are the same as the processes at S11 to S14 in FIG. 1, and detailed description thereof is omitted here.

As shown in FIG. 7, before the process at S11, a communication connection between the mobile device and a control terminal is established (S10).

The executing entity of the process at S10 can include the mobile device or one or more apparatuses/circuits in the mobile device.

The control terminal can be a remote controller for controlling the mobile device or another terminal device, such as a computer, a mobile phone, a tablet, or the like, which is installed with a program for controlling the mobile device.

At S11, a photographing command is received from the control terminal.

The exemplary mobile device control method in FIG. 7 can be combined with any one of the above-described exemplary mobile device control methods.

Figure 8:
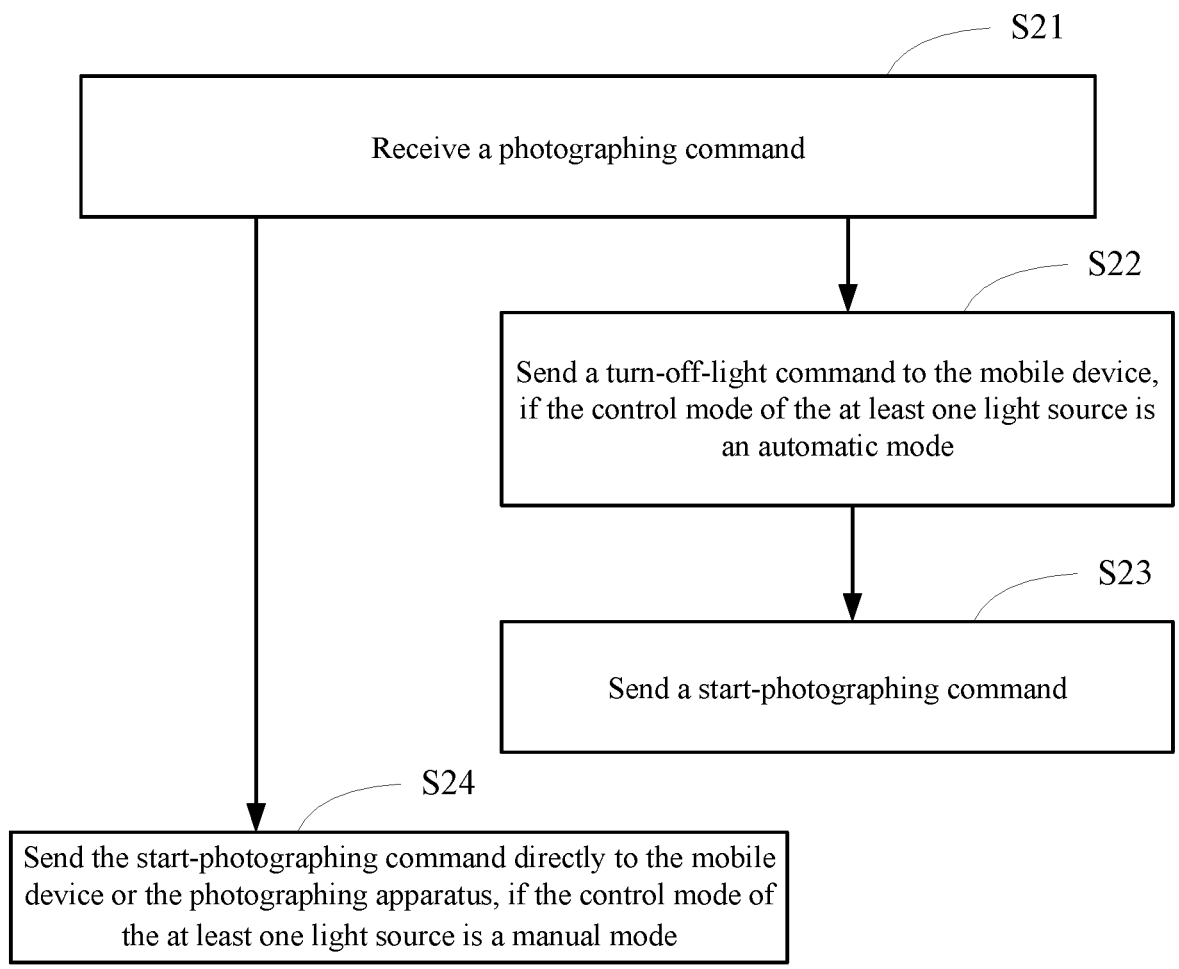
FIG. 8 is a flow chart of another mobile device control method according to an embodiment of the disclosure.

FIG. 8 shows a flow chart of another mobile device control method consistent with the disclosure. The executing entity of the control method in FIG. 8 can include a control terminal. The control terminal can be a remote controller for controlling the mobile device or another terminal device, such as a computer, a mobile phone, a tablet, or the like, which is installed with a program for controlling the mobile device.

As shown in FIG. 8, at S21, a photographing command is received.

The photographing command can be inputted by a user via an input apparatus, such as a touch screen, a button, or the like, and can also be sent by another device that is communicatively connected with the mobile device.

At S22, if the control mode of the at least one light source is an automatic mode, a command for turning off the at least one light source that affects the photographing effect, also referred to as the turn-off-light command, is sent to the mobile device.

At S23, a command for performing a photographing operation, also referred to as a "start-photographing command," is sent.

If the photographing apparatus in the mobile device is the executing entity of the start-photographing command, the start-photographing command can be sent to the mobile device. For example, the start-photographing command can be sent to a signal receiving apparatus/circuit, a control apparatus/circuit, or the photographing apparatus/circuit in the mobile device. If the photographing device that is independent of the mobile device is the executing entity of the start-photographing command, the start-photographing command can be sent to the photographing apparatus.

At S24, if the control mode of the at least one light source is a manual mode, the start-photographing command is sent directly to the mobile device or the photographing device.

According to the disclosure, the at least one light source that affects the photographing effect is turned off before the photographing operation is performed. As such, the lens flare caused by the at least one light source provided at the fuselage can be prevented without the use of a lens hood. The cost can be reduced and the versatility can be enhanced. Associating the turn-off-light operation with the photographing operation can provide an automatic function for a user, such that the user does not need to manually turn off the light sources. The problem of the lens flare can be solved without affecting the user experience.

Figure 9:
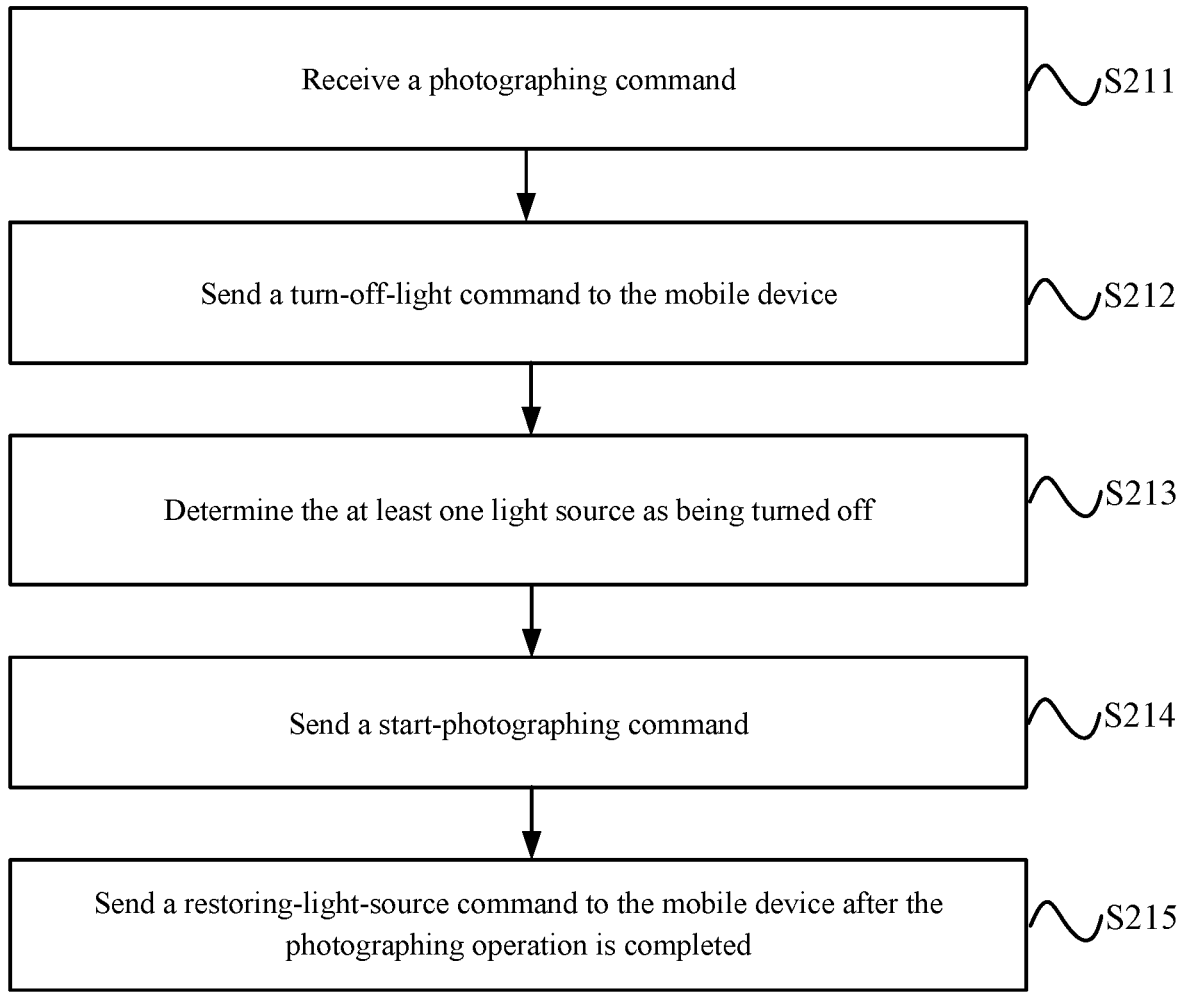
FIG. 9 is a flow chart of another mobile device control method according to an embodiment of the disclosure.

FIG. 9 shows a flow chart of another mobile device control method consistent with the disclosure. The processes at S211, S212, and S214 in FIG. 9 are similar to the processes at S21, S22, and S23 in FIG. 8, and detailed description thereof is omitted herein.

As shown in FIG. 9 at S211, a photographing command is received.

At S212, a turn-off-light command is sent to the mobile device.

At S213, the at least one light source is determined as being turned off.

The at least one light source can be confirmed to have been turned off through a feedback message sent by the mobile device after the mobile device turns off the at least one light source that affects the photographing effect in response to the turn-off-light command.

At S214, a start-photographing command is sent.

At S215, a command for restoring the at least one light source to work, also referred to as a "restoring-light-source command," is sent to the mobile device after the photographing operation is completed.

Restoring the at least one light source to work can refer to turning on the at least one light source or restoring the at least one light source to the default state.

Figure 10:
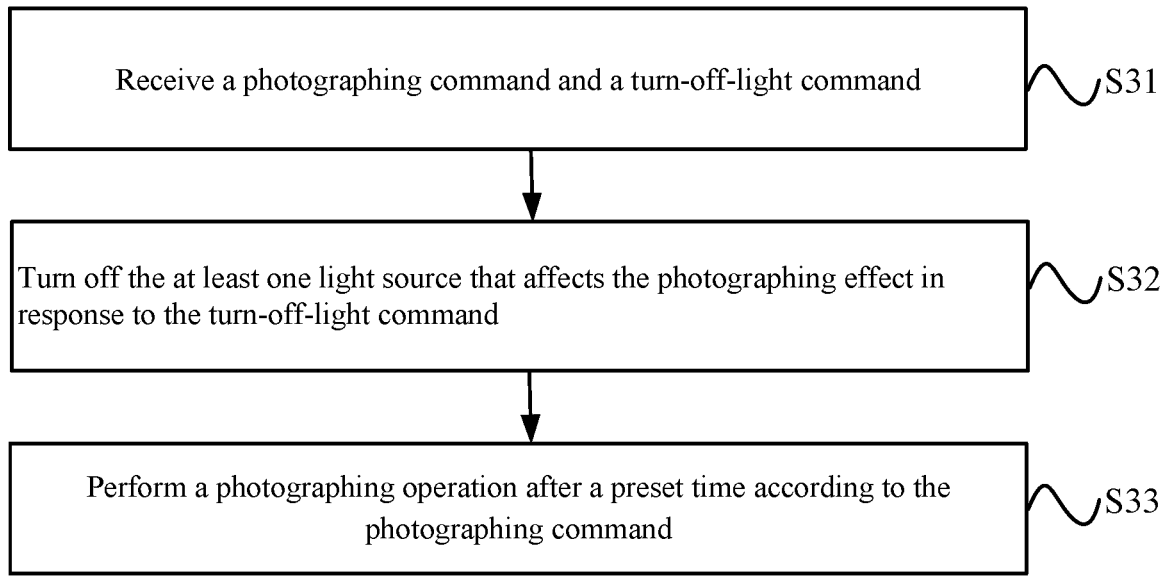
FIG. 10 is a flow chart of another mobile device control method according to an embodiment of the disclosure.

FIG. 10 shows a flow chart of another mobile device control method consistent with the disclosure. As shown in FIG. 10, at S31, a photographing command and a turn-off-light command are received.

The executing entity of the process at S31 can include a mobile device including the photographing apparatus. The mobile device can be a UAV, a driverless boat, a self-drive car, or the like. The executing entity can also include one or more apparatuses/circuits of the mobile device. When the mobile device does not include a photographing apparatus but may, for example, carry a photographing device that is relatively independent from the mobile device, the executing entity can include the photographing device and the mobile device, in which situation the photographing device can receive the photographing command and the mobile device can receive the turn-off-light command.

At S32, the at least one light source that affects the photographing effect is turned off in response to the turn-off-light command.

The executing entity of the process at S32 can include a mobile device including the photographing apparatus. The mobile device can be a UAV, a driverless boat, a self-drive car, or the like. The executing entity can also include one or more apparatuses/circuits of the mobile device. The at least one light source that affects photographing effect refer to one or more light sources with an arrangement position or a light emitting range falling into the FOV of the photographing apparatus. The light emitted from the at least one light source can cause the lens flare in the photographing apparatus.

At S33, a photographing operation is performed after a preset time according to the photographing command.

The executing entity of the process at S33 can include a mobile device including the photographing apparatus or can also include one or more apparatuses/circuits of the mobile device. When the mobile device does not include a photographing apparatus but may, for example, carry a photographing device that is relatively independent from the mobile device, the executing entity can include the photographing device. In some embodiments, the implementation of receiving the photographing command and the implementation of receiving the turn-off-light command can be completed simultaneously or in sequence. A suitable preset time can be set, such that the at least one light source can be turned off before the photographing operation.

According to the disclosure, the at least one light source that affects the photographing effect can be turned off before the photographing operation is performed. As such, the lens flare caused by the at least one light source provided at the fuselage can be prevented without the use of a lens hood. The cost can be reduced and the versatility can be enhanced. Associating the turn-off-light operation with the photographing operation can provide an automatic function for a user, such that the user does not need to manually turn off the light sources. The problem of lens flare can be solved without affecting the user experience.

The differences between the exemplary mobile device control methods in FIG. 1 and FIG. 10 are that the command received at S11 is the photographing command and the commands received at S31 are the photographing command and the turn-off-light command, and the photographing operation is performed after the preset time according to the photographing command (at S33), such that there is no need to interact with another device/apparatus/circuit to confirm that the at least one light source has been turned off before the photographing operation. Through the replacement or deletion of the corresponding processes, the exemplary mobile device control method in FIG. 10 can be combined with any one of or any combination of the above-described other exemplary mobile device control methods.

Figure 11:
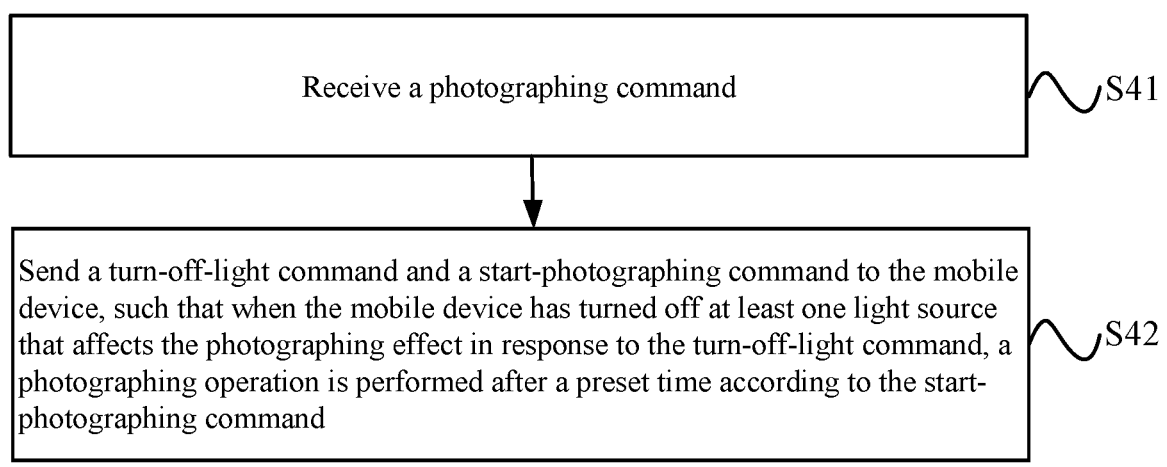
FIG. 11 is a flow chart of another mobile device control method according to an embodiment of the disclosure.

FIG. 11 shows a flow chart of another mobile device control method consistent with the disclosure. The executing entity of the control method in FIG. 11 includes a control terminal. The control terminal can be a remote controller for controlling the mobile device or another terminal device, such as a computer, a mobile phone, a tablet, or the like, which is installed with a program for controlling the mobile device.

As shown in FIG. 11, at S41, a photographing command is received.

The photographing command can be inputted by a user via an input apparatus, such as a touch screen, a button, or the like, and can also be sent by another device that is communicatively connected with the mobile device.

In some embodiments, after the process at S41, the control mode of at least one light source can be determined. If the control mode of the at least one light source is an automatic mode, the process can proceed to the process at S42. If the control mode of the at least one light source is a manual mode, a start-photographing command can be sent directly to the mobile device or the photographing device.

At S42, a turn-off-light command and a start-photographing command are sent to the mobile device, such that when the mobile device has turned off at least one light source that affects the photographing effect in response to the turn-off-light command, a photographing operation is performed after a preset time according to the start-photographing command.

In some embodiments, the turn-off-light command can be sent to the mobile device, such that the mobile device can turn off at least one light source that affects the photographing effect in response to the turn-off-light command. The start-photographing command can be sent to the photographing device, such that the photographing operation can be performed by the photographing device after the preset time according to the start-photographing command.

Figure 12:
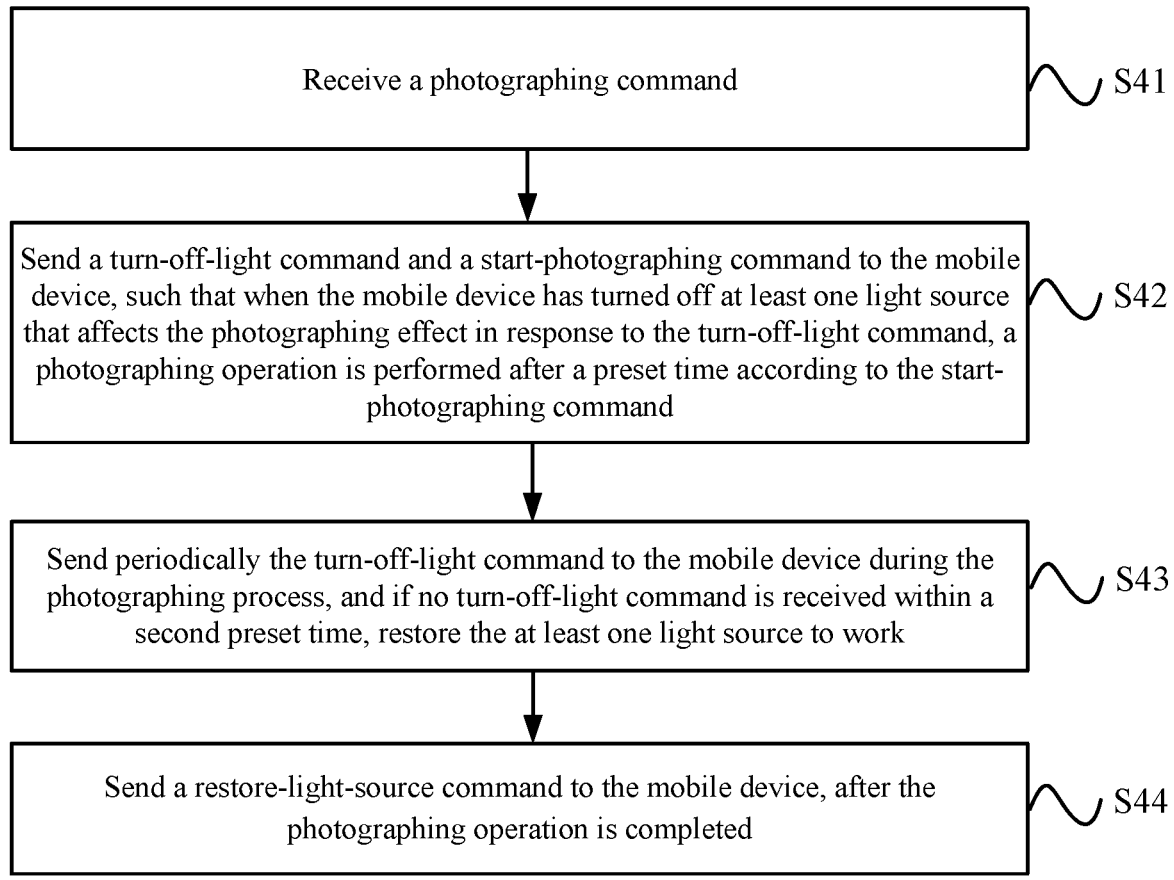
FIG. 12 is a flow chart of another mobile device control method according to an embodiment of the disclosure.

FIG. 12 shows a flow chart of another mobile device control method consistent with the disclosure. The processes at S41 and S42 in FIG. 12 are the same as the processes at S41 and S42 in FIG. 11, and detailed description thereof is omitted herein.

As shown in FIG. 12, at S43, the turn-off-light command is periodically sent to the mobile device during the photographing process, and if no turn-off-light command is received within a second preset time, the at least one light source is restored to work.

As such, the problem that the state of the at least one light source is remained to be off and cannot be restored due to the loss of state caused by a failure or restart can be prevented.

Herein, the second preset time refers to a time delay for restoring the at least one light source to work, which is different from the time delay for starting to perform the photographing operation. Restoring the at least one light source to work can refer to turning on the at least one light source or restoring the at least one light source to the default state.

At S44, a command for restoring the at least one light source to work, also referred to as a "restoring-light-source command," is sent to the mobile device, after the photographing operation is completed.

Restoring the at least one light source to work can refer to turning on the at least one light source or restoring the at least one light source to the default state.

Figure 13:
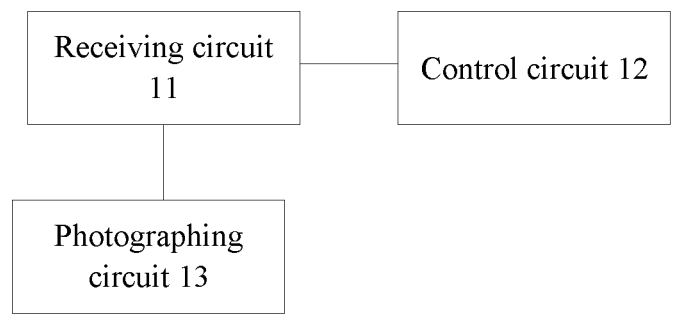
FIG. 13 is a schematic structural diagram of a mobile device control apparatus according to an embodiment of the disclosure.

FIG. 13 shows a schematic structural diagram of a mobile device control apparatus consistent with the disclosure. As shown in FIG. 13, the control apparatus includes a receiving circuit 11, a control circuit 12, and a photographing circuit 13.

The receiving circuit 11 is configured to receive a photographing command.

The control circuit 12 is configured to turn off at least one light source that affects the photographing effect in response to the photographing command.

The photographing circuit 13 is configured to perform a photographing operation in response to the photographing command.

The circuits provided in the exemplary mobile device control apparatus in FIG. 13 are configured to implement the processes of the exemplary mobile device control method in FIG. 1, and the detailed description is omitted here.

In some embodiments, the control circuit 12 can be further configured to turn on the at least one light source after the photographing circuit 13 completes the photographing operation.

In some embodiments, the control circuit 12 can be configured to obtain a photographing-completion feedback message and turn on the at least one light source.

In some embodiments, the photographing circuit 13 can be configured to send a feedback command for turning on the at least one light source to the control circuit 12 after the completion of the photographing operation. The control circuit 12 can turn on the at least one light source according to the feedback command.

In some embodiments, if the photographing command received by the receiving circuit 11 is shooting an image, the control circuit 12 can turn on the at least one light source after a first preset time after the photographing operation implemented by the photographing circuit 13.

In some embodiments, if the photographing command received by the receiving circuit 11 is recording a video, the photographing circuit 13 can periodically send a turn-off-light command to the control circuit 12 during the recording process. If the control circuit 12 does not receive any turn-off-light command within a second preset time, the control circuit 12 can control to turn on the at least one light source.

In some embodiments, the photographing circuit 13 can be further configured to receive a stop-photographing command, stop the recording process, and stop sending the turn-off-light command to the control circuit 12 according to the stop-photographing command.

In some embodiments, the receiving circuit 11 can be configured to receive a light-source-default-setting command and the control circuit 12 can set the default state of the at least one light source according to the light-source-default-setting command.

In some embodiments, if the photographing command received by the receiving circuit 11 is shooting an image, the control circuit 12 can restore the at least one light source to the default state after a preset time, in response to the photographing circuit 13 completing the photographing operation.

In some embodiments, if the photographing command received by the receiving circuit 11 is recoding a video, the photographing circuit 13 can periodically send the turn-off-light command to the control circuit 12 during the recording process. If the control circuit 12 does not receive any turn-off-light command within a preset time, the control circuit 12 restores the at least one light source to the default state.

In some embodiments, the receiving circuit 11 can be configured to receive a control mode of the at least one light source. If the control mode of the at least one light source is an automatic mode, the control circuit 12 can turn off the at least one light source in response to the photographing command, or the photographing circuit 13 can response to the photographing command by informing the control circuit 12 to turn off the at least one light source. If the control mode of the at least one light source is a manual mode, the photographing circuit 13 can perform the photographing immediately.

The circuits provided in the exemplary mobile device control apparatus in FIG. 13 are configured to implement the processes of any one of or any combination of the exemplary mobile device control methods shown in, e.g., FIGS. 3 to 5, and the detailed description thereof is omitted here.

Figure 14:
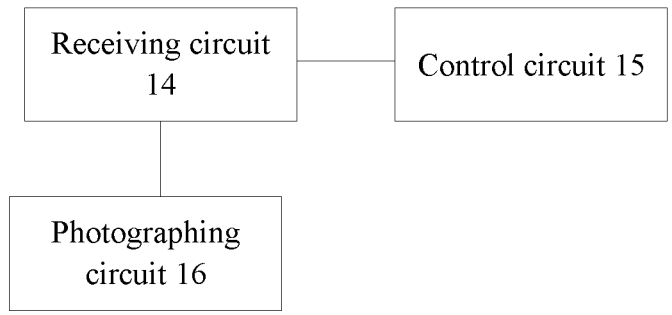
FIG. 14 is a schematic structural diagram of another mobile device control apparatus according to an embodiment of the disclosure.

FIG. 14 shows a schematic structural diagram of another mobile device control apparatus consistent with the disclosure. As shown in FIG. 14, the control apparatus includes a receiving circuit 14, a control circuit 15, and a photographing circuit 16.

The receiving circuit 14 is configured to receive a photographing command and a turn-off-light command.

The control circuit 15 is configured to turn off at least one light source that affects the photographing effect in response to the turn-off-light command.

The photographing circuit 16 is configured to perform a photographing operation after a preset time according to the photographing command.

The circuits provided in the exemplary mobile device control apparatus in FIG. 14 are configured to implement the processes of the exemplary mobile device control method shown in, e.g., FIG. 10, for which the detailed description is omitted.

In some embodiments, the control circuit 15 can be further configured to turn on the at least one light source after the completion of the photographing operation.

In some embodiments, the control circuit 15 can be configured to obtain a photographing-completion feedback message and turn on the at least one light source.

In some embodiments, the photographing circuit 16 can be configured to send a feedback command for turning on the at least one light source to the control circuit 15 after the completion of the photographing operation. The control circuit 15 can turn on the at least one light source according to the feedback command.

In some embodiments, if the photographing command received by the receiving circuit 14 is shooting an image, the control circuit 16 can turn on the at least one light source after a first preset time after the photographing operation implemented by the photographing circuit 15.

In some embodiments, if the photographing command received by the receiving circuit 14 is recording a video, the photographing circuit 16 can periodically send a turn-off-light command to the control circuit 15 during the recording process. If the control circuit 15 does not receive any turn-off-light command within a second preset time, the control circuit 15 can control to turn on the at least one light source.

In some embodiments, the photographing circuit 16 can be further configured to receive a stop-photographing command, stop the recording process, and stop sending the turn-off-light command to the control circuit 15 according to the stop-photographing command.

In some embodiments, the receiving circuit 14 can be further configured to receive a light-source-default-setting command and the control circuit 15 can set the default state of the at least one light source according to the light-source-default-setting command.

In some embodiments, if the photographing command received by the receiving circuit 14 is shooting an image, the control circuit 15 can restore the at least one light source to the default state after a preset time, in response to the photographing circuit 16 completing the photographing operation.

In some embodiments, if the photographing command received by the receiving circuit 14 is recoding a video, the photographing circuit 16 can periodically send the turn-off-light command to the control circuit 15 during the recording process. If the control circuit 15 does not receive any turn-off-light command within a preset time, the control circuit 15 can restore the at least one light source to the default state.

In some embodiments, the receiving circuit 14 can be configured to receive a control mode of the at least one light source. If the control mode of the at least one light source is an automatic mode, the control circuit 15 can turn off the at least one light source in response to the photographing command, or the photographing circuit 16 can response to the photographing command by informing the control circuit 15 to turn off the at least one light source. If the control mode of the at least one light source is a manual mode, the photographing circuit 16 can perform the photographing immediately.

The circuits provided in the exemplary mobile device control apparatus in FIG. 13 are configured to implement the processes of the combination between the exemplary device control method in FIG. 10 with any one of or any combination of the exemplary device control methods shown in, e.g., FIGS. 3 to 5, through the replacement or deletion of the corresponding processes, and the detailed description thereof is omitted here.

Figure 15:
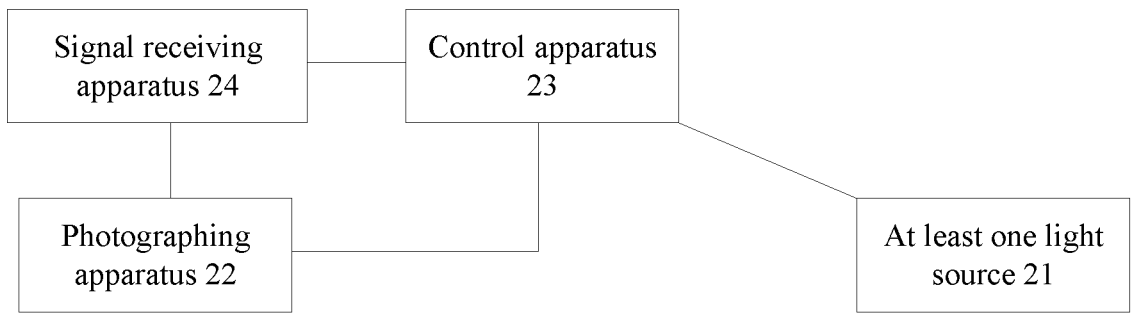
FIG. 15 is a schematic structural diagram of a mobile device according to an embodiment of the disclosure.

FIG. 15 shows a schematic structural diagram of another example mobile device consistent with the disclosure. As shown in FIG. 15, the mobile device includes at least one light source 21, a photographing apparatus 22, a control apparatus 23, and a signal receiving apparatus 24. The photographing apparatus 22, the control apparatus 23, and the signal receiving apparatus 24 are communicatively connected between any two of them.

The signal receiving apparatus 24 is configured to receive a photographing command.

The control apparatus 23 is configured to turn off at least one light source 21 that affects the photographing effect in response to the photographing command.

The photographing apparatus 22 is configured to perform a photographing operation in response to the photographing command.

In some embodiments, the at least one light source 21 can be controlled by the control apparatus 23. In some other embodiments, the at least one light source 21 can be controlled by the photographing apparatus 22 that is communicatively connected to the at least one light source 21. In some embodiments, the photographing apparatus 22 can directly receive the photographing command from the signal receiving apparatus 24. In some other embodiments, the photographing apparatus 22 can receive the photographing command from the signal receiving apparatus 24 via the control apparatus 23. The mobile device can be a UAV, a driverless boat, a self-drive car, or the like. The photographing apparatus 22, the control apparatus 23, and the signal receiving apparatus 24 shown in FIG. 15 can be communicatively connected between any two of them. When there is no need for direct interaction between any two of them, the corresponding connection can be omitted.

In some embodiments, the control apparatus 23 can be configured to turn on the at least one light source 21 after the photographing apparatus 22 completes the photographing operation.

In some embodiments, the control apparatus 23 can be configured to obtain a photographing-completion feedback message and turn on the at least one light source 21.

In some embodiments, the photographing apparatus 22 can be configured to send a feedback message for turning on the at least one light source 21 to the control apparatus 23 after the completion of the photographing operation. The control apparatus 23 can turn on the at least one light source 21 according to the feedback command.

In some embodiments, if the photographing command received by the signal receiving apparatus 24 is shooting an image, the control apparatus 23 can turn on the at least one light source 21 after a first preset time after the photographing operation implemented by the photographing apparatus 22.

In some embodiments, if the photographing command received by the signal receiving apparatus 24 is recording a video, the photographing apparatus 22 can periodically send a turn-off-light command to the control apparatus 23 during the recording process. If the control apparatus 23 does not receive any turn-off-light command within a second preset time, the control apparatus 23 can control to turn on the at least one light source 21.

In some embodiments, the photographing apparatus 22 can be further configured to receive a stop-photographing command, stop the recording process, and stop sending the turn-off-light command to the control apparatus 23 according to the stop-photographing command.

In some embodiments, the signal receiving apparatus 24 can be configured to receiving the photographing command. The photographing apparatus 22 can be configured to send the turn-off-light command to the control apparatus 23 according to the photographing command received by the signal receiving apparatus 24. The control apparatus 23 can be configured to turn off at least one light source 21 that affects the photographing effect in response to the turn-off-light command. The photographing apparatus 22 can perform the photographing operation according to the photographing command.

In some embodiments, the signal receiving apparatus 24 is configured to receiving the photographing command. The control apparatus 23 can be configured to turn off at least one light source 21 that affects the photographing effect according to the photographing command received by the signal receiving apparatus 24, and send the photographing command to the photographing apparatus 22 to perform the photographing operation. The photographing apparatus 22 can perform the photographing operation according to the photographing command.

In some embodiments, the photographing apparatus 22 can be further configured to perform the photographing after confirming that the at least one light source 21 has been turned off or delaying a third preset time.

In some embodiments, the photographing apparatus 22 can be configured to receive a feedback command sent by the control apparatus 23 after the at least one light source 21 that affects the photographing effect are turned off.

In some embodiments, the signal receiving apparatus 24 can be further configured to receive a light-source-default-setting command and the control apparatus 23 can set the default state of the at least one light source 21 according to the light-source-default-setting command.

In some embodiments, if the photographing command received by the signal receiving apparatus 24 is shooting an image, the control apparatus 23 can restore the at least one light source 21 to the default state after a preset time, in response to the photographing apparatus 22 completing the photographing operation.

In some embodiments, if the photographing command received by the signal receiving apparatus 24 is recoding a video, the photographing apparatus 22 can periodically send the turn-off-light command to the control apparatus 23 during the recording process. If the control apparatus 23 does not receive any turn-off-light command within a preset time, the control apparatus 23 can restore the at least one light source 21 to the default state.

In some embodiments, the signal receiving apparatus 24 can be configured to receive a control mode of the at least one light source 21. If the control mode of the at least one light source 21 is an automatic mode, the control apparatus 23 can turn off the at least one light source 21 in response to the photographing command, or the photographing apparatus 22 can response to the photographing command by informing the control apparatus 23 to turn off the at least one light source 21. If the control mode of the at least one light source 21 is a manual mode, the photographing apparatus 22 can perform the photographing immediately.

In some embodiments, the control apparatus 23 can include a controller, an ECU, or a MCU of the mobile device.

In some embodiments, the signal receiving apparatus 24 and the control apparatus 23 or the photographing apparatus 22 can be integrated together.

In some embodiments, the mobile device can include a UAV.

In some embodiments, the signal receiving apparatus 24 can be configured to establish a communication connection with a control terminal, and receive the photographing command sent by the control terminal.

For the functions of the apparatuses provided in the mobile device, reference can be made to the corresponding exemplary mobile device control method described above, and detailed description thereof is omitted here.

Figure 16:
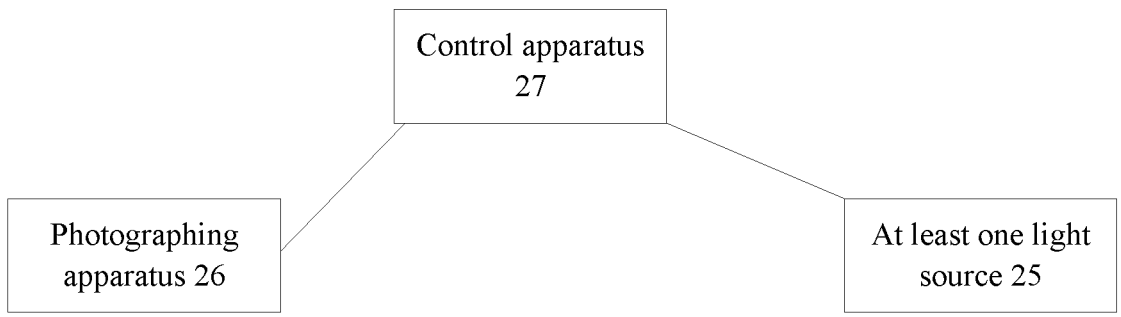
FIG. 16 is a schematic structural diagram of another mobile device according to an exemplary embodiment of the disclosure.

FIG. 16 shows a schematic structural diagram of another example mobile device consistent with the disclosure. As shown in FIG. 16, the mobile device includes at least one light source 25, a photographing apparatus 26, and a control apparatus 27 that is communicatively connected to the control apparatus 27.

The photographing apparatus 26 is configured to receive a photographing command and the control apparatus 27 is configured to receive a turn-off-light command.

The control apparatus 27 is configured to turn off the at least one light source 25 that affects the photographing effect in response to the turn-off-light command.

The photographing apparatus 26 is configured to perform a photographing operation after a preset time according to the photographing command.

The photographing command can be received by the photographing apparatus 26 directly or can be received by the control apparatus 27. The mobile device can include a UAV, a driverless boat, a self-drive car, or the like.

In some embodiments, the control apparatus 27 can be configured to turn on the at least one light source 25 after the photographing apparatus 26 completes the photographing operation.

In some embodiments, the control apparatus 27 can be configured to obtain a photographing-completion feedback message and turn on the at least one light source 25.

In some embodiments, the photographing apparatus 26 can be configured to send a feedback command for turning on the at least one light source 25 to the control apparatus 27 after the completion of the photographing operation. The control apparatus 27 can turn on the at least one light source 25 according to the feedback command.

In some embodiments, if the photographing command received by the photographing apparatus 26 is shooting an image, the control apparatus 27 can turn on the at least one light source 25 after a first preset time after the photographing operation implemented by the photographing apparatus 26.

In some embodiments, if the photographing command received by the photographing apparatus 26 is recording a video, the photographing apparatus 26 can periodically send a turn-off-light command to the control apparatus 27 during the recording process. If the control apparatus 27 does not receive any turn-off-light command within a second preset time, the control apparatus 27 can control to turn on the at least one light source 25.

In some embodiments, the photographing apparatus 26 can be further configured to receive a stop-photographing command, stop the recording process, and stop sending the turn-off-light command to the control apparatus 27 according to the stop-photographing command.

In some embodiments, the control apparatus 27 can be further configured to receive a light-source-default-setting command and the control apparatus 27 can set the default state of the at least one light source 25 according to the light-source-default-setting command.

In some embodiments, if the photographing command received by the photographing apparatus 26 is shooting an image, the control apparatus 27 can restore the at least one light source 25 to the default state after a preset time, in response to the photographing apparatus 26 completing the photographing operation.

In some embodiments, if the photographing command received by the photographing apparatus 26 is recoding a video, the photographing apparatus 26 can periodically send the turn-off-light command to the control apparatus 27 during the recording process. If the control apparatus 27 does not receive any turn-off-light command within a preset time, the control apparatus 27 can restore the at least one light source 25 to the default state.

In some embodiments, the control apparatus 27 can be configured to receive a control mode of the at least one light source 25. If the control mode of the at least one light source 25 is an automatic mode, the control apparatus 27 can turn off the at least one light source 25 in response to the turn-off-light command. If the control mode of the at least one light source 25 is a manual mode, the photographing apparatus 26 can perform the photographing immediately.

In some embodiments, the control apparatus 27 can include a controller, an ECU, or a MCU of the mobile device.

In some embodiments, the mobile device can include a UAV.

In some embodiments, the photographing apparatus 26 can be configured to establish a communication connection with a control terminal, and receive the photographing command sent by the control terminal.

For the functions of apparatus provided in the mobile device, reference can be made to the corresponding exemplary mobile device control method described above, and detailed description is omitted here.

Figure 17:
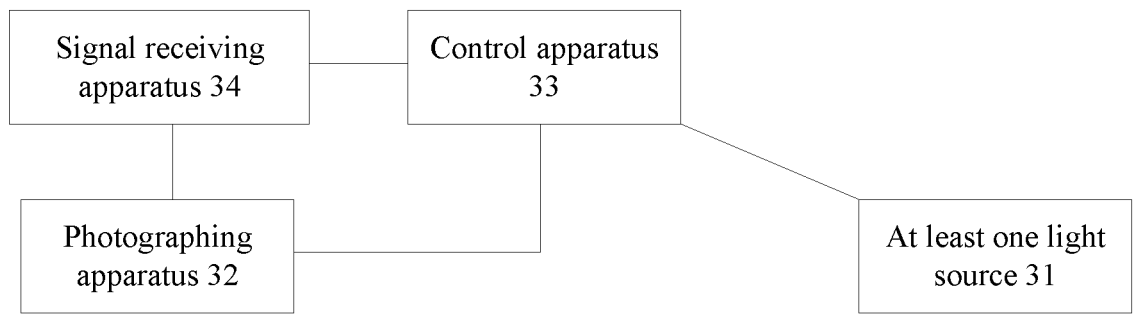
FIG. 17 is a schematic structural diagram of an unmanned aerial vehicle (UAV) according to an embodiment of the disclosure.

FIG. 17 shows a schematic structural diagram of a UAV consistent with the disclosure. The UAV includes at least one light source 31, a photographing apparatus 32, a control apparatus 33, and a signal receiving apparatus 34. The photographing apparatus 32, the control apparatus 33, and the signal receiving apparatus 34 are communicatively connected between any two of them.

The arrangement position or light emitting range of at least one of the at least one light source 31 falls into the FOV of the photographing apparatus 32. The signal receiving apparatus 34 can be configured to receive a photographing command. The control apparatus 33 can be configured to turn off at least one light source 31 that affects the photographing effect in response to the turn-off-light command. The photographing apparatus 32 can perform the photographing operation according to the photographing command.

In some embodiments, the at least one light source 31 can be controlled by the control apparatus 33 and can also be controlled by the photographing apparatus 32. The photographing apparatus 32 can receive the photographing command directly from the signal receiving apparatus 34 and can also receive the photographing command from the signal receiving apparatus 34 via the control apparatus 33. The photographing apparatus 32, the control apparatus 33, and the signal receiving apparatus 34 shown in FIG. 17 can be communicatively connected between any two of them. When there is no need for direct interaction between any two of them, the corresponding connection can be omitted.

In some embodiments, the control apparatus 33 can be configured to turn on the at least one light source 31 after the photographing apparatus 32 completes the photographing operation.

In some embodiments, the UAV can further include arms (not shown). The photographing apparatus 32 and/or at least one of the at least one light source 31 can be provided under the arms.

In some embodiments, the UAV can further include a housing (not shown). The control apparatus 33 can be provided inside the housing.

In some embodiments, the control apparatus 33 can include a controller, an ECU, or a MCU of the mobile device.

In some embodiments, the signal receiving apparatus 34 can be integrated with the control apparatus 33 or the photographing apparatus 32 as an integral apparatus.

For the functions of components provided in the UAV, reference can be made to the corresponding exemplary mobile device control method described above, and detailed description thereof is omitted here.

Figure 18:
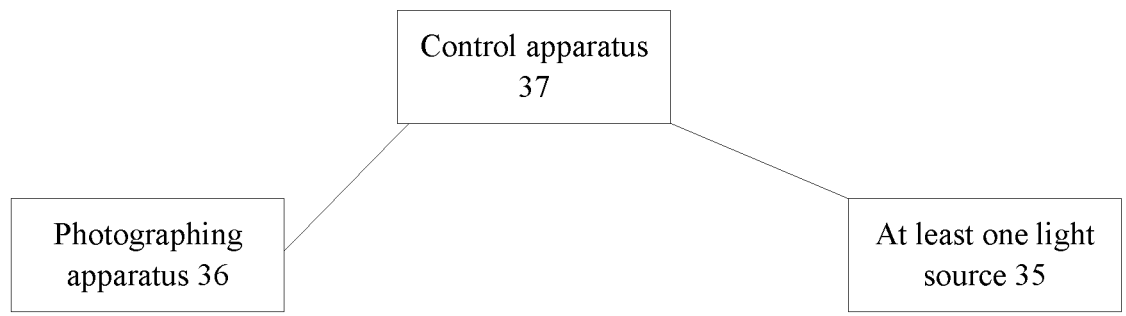
FIG. 18 is a schematic structural diagram of another UAV according to an embodiment of the disclosure.

FIG. 18 shows a schematic structural diagram of another example UAV consistent with the disclosure. The UAV includes at least one light source 35, a photographing apparatus 36, a control apparatus 37 that is communicatively connected to the photographing apparatus 36.

The arrangement position or light emitting range of at least one of the at least one light source 35 can fall into the FOV of the photographing apparatus 36. The photographing apparatus 36 can be configured to receive a photographing command. The control apparatus 37 can be configured to turn off at least one light source 35 that affects the photographing effect in response to the turn-off-light command. The photographing apparatus 36 can perform the photographing operation according to the photographing command.

In some embodiments, the control apparatus 37 can be configured to turn on the at least one light source 35 after the photographing apparatus 36 completes the photographing operation.

In some embodiments, the UAV can further include arms (not shown). The photographing apparatus 36 and at least one of the at least one light source 35 can be provided under one of the arms.

In some embodiments, the UAV can further include a housing (not shown). The control apparatus 37 can be provided inside the housing.

In some embodiments, the control apparatus 37 can include a controller, an ECU, or a MCU of the mobile device.

For functions of components provided in the UAV, reference can be made to the corresponding exemplary mobile device control method described above, and detailed description thereof is omitted here.

There is provided a controller consistent with the disclosure. The controller is configured to receive a photographing command, turn off at least one light source that affects the photographing effect in response to the photographing command, and send the photographing command to a photographing apparatus for controlling the photographing apparatus to perform a photographing operation.

In some embodiments, the controller can be further configured to turn on the at least one light source after the completion of the photographing operation, or restore the at least one light source to the default state.

There is provided another controller consistent with the disclosure. The controller is configured to receive a photographing command and a turn-off-light command, turn off at least one light source that affects the photographing effect in response to the turn-off-light command, and perform a photographing operation after a preset time according to the photographing command.

In some embodiments, the controller can be further configured to turn on the at least one light source after the completion of the photographing operation, or restore the at least one light source to the default state.

For the processes implemented by the above-described controllers, reference can be made to the corresponding exemplary mobile device control method described above, and detailed description thereof is omitted here.

There is provided a memory consistent with the disclosure. The memory is configured to store program instructions, when executed by a controller, causing the controller to receive a photographing command, turn off at least one light source that affects the photographing effect in response to the photographing command, and send the photographing command to a photographing apparatus for controlling the photographing apparatus to perform a photographing operation.

In some embodiments, the program instructions stored in the memory can further cause the controller to turn on the at least one light source after the completion of the photographing operation, or restore the at least one light source to the default state.

There is provided another memory consistent with the disclosure. The memory is configured to store program instructions, when executed by a controller, causing the controller to establish a communication connection between a mobile device and a control terminal, receive a photographing command and a turn-off-light command sent by the control terminal, turn off at least one light source that affects the photographing effect in response to the turn-off-light command, and perform a photographing operation after a preset time according to the photographing command.

In some embodiments, the program instructions stored in the memory further cause the controller to turn on the at least one light source after the completion of the photographing operation, or restore the at least one light source to the default state.

For the program instructions stored in the above-described memories, reference can be made to the corresponding exemplary mobile device control method described above, and detailed description thereof is omitted here.

Figure 19:
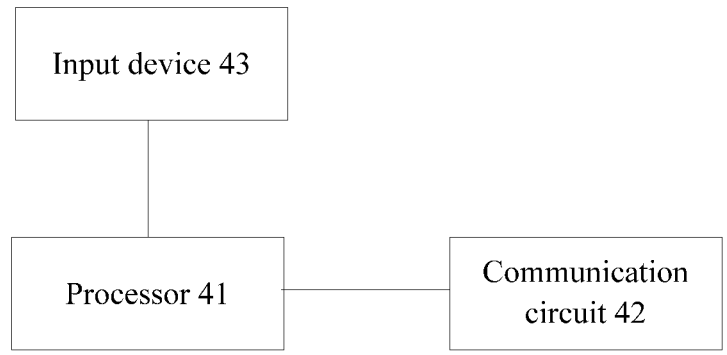
FIG. 19 is a schematic structural diagram of a control terminal according to an embodiment of the disclosure.

FIG. 19 shows a schematic structural diagram of a control terminal consistent with the disclosure. As shown in FIG. 19, the control terminal includes a processor 41, a communication circuit 42, and an input device 43. The processor 41 is coupled to the communication circuit 42 and the input device 43.

The processor 41 is configured to receive a photographing command through the input device 43 or the communication circuit 42, send a turn-off-light command to a mobile device through the communication circuit 42, and send a start-photographing command to a photographing device through the communication circuit 42.

In some embodiments, the processor 41 can be further configured to send a restoring-light-source command to the mobile device through the communication circuit 42 after the completion of the photographing operation.

In some embodiments, the processor 41 can be configured to the start-photographing command to the photographing device through the communication circuit 42 after confirming that at least one light source has been turned off.

In some embodiments, the processor 41 can be configured to receive a feedback message sent by the mobile device through the communication circuit 42, after the mobile device turning off the at least one light source that affects the photographing effect in response to the turn-off-light command, to confirm that the at least one light source has been turned off.

In some embodiments, the processor 41 can be further configured to periodically send the turn-off-light command to the mobile device through the communication circuit 42 during the recording process. If the mobile device does not receive any turn-off-light command within a preset time, the mobile device can control to restore the at least one light source to work.

In some embodiments, if a control mode of the at least one light source is an automatic mode, the processor 41 can send the turn-off-light command to the mobile device through the communication circuit 42, otherwise, can send the start-photographing command to the photographing device through the communication circuit 42.

In some embodiments, the processor 41 can be further configured to receive a stop-photographing command through the input device 43 or the communication circuit 42, send the stop-photographing command to the photographing device through the communication circuit 42, and send the restoring-light-source command to the mobile device through the communication circuit 42.

Figure 20:
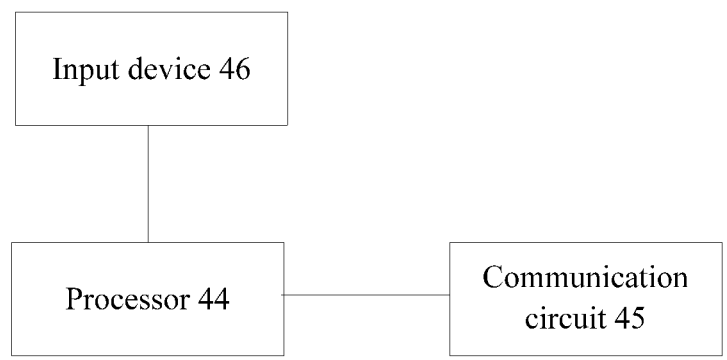
FIG. 20 is a schematic structural diagram of another control terminal according to an embodiment of the disclosure.

FIG. 20 shows a schematic structural diagram of another control terminal consistent with the disclosure. As shown in FIG. 20, the control terminal includes a processor 44, a communication circuit 45, and an input device 46. The processor 44 is coupled to the communication circuit 45 and the input device 46.

The processor 44 can be configured to receive a photographing command through the input device 46 or the communication circuit 45, and send a turn-off-light command and a start-photographing command to a mobile device through the communication circuit 45. As such, a photographing operation can be performed according to the photographing command, after the mobile device turning off at least one light source that affects the photographing effect in response to the turn-off-light command.

In some embodiments, the processor 44 can be further configured to send a restoring-light-source command to the mobile device through the communication circuit 45 after the completion of the photographing operation.

In some embodiments, the processor 44 can be further configured to periodically send the turn-off-light command to the mobile device through the communication circuit 45 during the recording process. If the mobile device does not receive any turn-off-light command within a preset time, the mobile device can control to restore the at least one light source to work.

In some embodiments, if a control mode of the at least one light source is an automatic mode, the processor 44 can send the turn-off-light command to the mobile device through the communication circuit 45, otherwise, can send the start-photographing command to the photographing apparatus through the communication circuit 45.

In some embodiments, the processor 44 can be further configured to receive a stop-photographing command through the input device 46 or the communication circuit 45, send the stop-photographing command to the photographing apparatus through the communication circuit 45, and send the restoring-light-source command to the mobile device through the communication circuit 45.

For functions of components provided in the control terminal, reference can be made to the corresponding exemplary mobile device control method described above, and detailed description thereof is omitted here.

Figure 21:
FIG. 21 is a schematic structural diagram of a photographing device according to an embodiment of the disclosure.

FIG. 21 shows a schematic structural diagram of a photographing device consistent with the disclosure. As shown in FIG. 21, the photographing apparatus includes a device body 51 and a communication circuit 52 that is electronic connected to the device body 51.

The communication circuit 52 is configured to receive a photographing command, send a turn-off-light command to a mobile device which carries the photographing apparatus, and inform the device body 51 to start photographing after confirming the at least one light source is turned off or after a preset time.

In some embodiments, the communication circuit 52 can be configure to receive a feedback message sent by the mobile device after the mobile device turning off the at least one light source that affects the photographing effect in response to the turn-off-light command, to confirm that the at least one light source has been turned off.

In some embodiments, the communication circuit 52 can be further configure to periodically send the turn-off-light command to the mobile device during the recording process. If the mobile device does not receive any turn-off-light command within a second preset time, the mobile device can control to restore the at least one light source to work.

In some embodiments, the communication circuit 52 can be further configured to receive a stop-photographing command, inform the device body 51 to stop the photographing operation, and send a restoring-light-source command to the mobile device.

In some embodiments, restoring the at least one light source to work can refer to turning on the at least one light source or restoring the at least one light source to the default state.

In some embodiments, the communication circuit 52 can be further configured to determine whether a control mode of the at least one light source is an automatic mode after receiving the photographing command. If the control mode of the at least one light source is an automatic mode, the turn-off-light command can be sent to the mobile device, otherwise, the device body 51 can be informed to perform photographing operation.

For functions of components provided in the photographing device, reference can be made to the corresponding exemplary mobile device control method described above, and detailed description thereof is omitted here.

The disclosed control apparatus of the mobile device, mobile device, UAV, controller, memory, control terminal, and photographing device may be implemented in other manners not described here. For example, the control apparatus of the mobile device, mobile device, UAV, controller, memory, control terminal, and photographing device described above are merely illustrative. For example, the division of units/circuits may only be a logical function division, and there may be other ways of dividing the units/circuits. For example, multiple units or circuits may be combined or may be integrated into another system, or some feature may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit. The functional units may be implemented either in hardware or in the form of software functional units.

The functional units consistent with the disclosure can be implemented in the form of computer program stored in a non-transitory computer-readable storage medium, which can be sold or used as a standalone product. The computer program can include instructions that enable a computer device, such as a personal computer, a server, or a network device, or a processor, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A mobile device control method comprising:
   receiving a photographing command;
   performing a photographing operation according to the photographing command;

periodically receiving a turn-off-light command while the photographing operation is being performed in response to the photographing command;
turning off a light source in response to receipt of the turn-off-light command;
continuing to periodically receive the turn-off-light command after the light source is turned off while the photographing operation is being performed, including:
  receiving at a first timepoint the turn-off-light command to turn off the light source; and
  receiving at a second timepoint the turn-off-light command to turn off the light source, the second timepoint being within a preset period from the first timepoint;
receiving an indication that the photographing operation is completed; and
turning back on the light source in response to receipt of the indication.

2. The method of claim 1, wherein:
the photographing command includes an image shooting command; or
the photographing command includes a video recording command.

3. The method of claim 1, wherein the photographing command includes a video recording command, and the method further comprising:
receiving a stop-photographing command;
stopping the recording process; and
stopping receiving the turn-off-light command.

4. The method of claim 1, further comprising:
receiving a light-source-default-setting command; and
setting the light source to a default state, wherein the light source when being at the default state includes different colors.

5. The method of claim 4, wherein:
the photographing command includes an image shooting command, and the method further comprising: restoring the light source to the default state after a preset time after the photographing operation is performed; and/or
the photographing command includes a video recording command, and the method further comprising: restoring the light source to the default state further in response to not receiving the turn-off-light command after a preset time.

6. The method of claim 1, further comprising, after receiving the photographing command:
turning off the light source in response to the photographing command if a control mode of the light source is an automatic mode; and
performing the photographing operation immediately if the control mode of the light source is not the automatic mode.

7. A mobile device comprising: a memory and a processor coupled to the memory, the processor being configured to:
receive a photographing command;
perform a photographing operation according to the photographing command;
periodically receive a turn-off-light command while the photographing operation is being performed in response to the photographing command;
turn off a light source in response to receipt of the turn-off-light command;
continue to periodically receive the turn-off-light command after the light source is turned off while the photographing operation is being performed, including:
  receiving at a first timepoint the turn-off-light command to turn off the light source; and
  receiving at a second timepoint the turn-off-light command to turn off the light source, the second timepoint being within a preset period from the first timepoint;
receive an indication that the turn-off-light command has not been received for a preset time, the indication indicating that the photographing operation is completed; and
turn back on the light source in response to receipt of the indication.

8. The device of claim 7, wherein:
the photographing command includes an image shooting command; or
the photographing command includes a video recording command.

9. The device of claim 7, wherein the photographing command includes a video recording command, and wherein the processor is further configured to:
receive a stop-photographing command;
stop the recording process; and
stop sending the turn-off-light command.

10. An unmanned aerial vehicle (UAV) comprising: a memory and a processor coupled to the memory, the processor being configured to:
receive a photographing command;
perform a photographing operation according to the photographing command;
periodically receive a turn-off-light command while the photographing operation is being performed in response to the photographing command;
turn off a light source in response to receipt of the turn-off-light command;
continue to periodically receive the turn-off-light command after the light source is turned off while the photographing operation is still being performed, including:
  receiving at a first timepoint the turn-off-light command to turn off the light source; and
  receiving at a second timepoint the turn-off-light command to turn off the light source, the second timepoint being within a preset period from the first timepoint;
receive an indication that the turn-off-light command has not been received for a preset time, the indication indicating that the photographing operation is completed; and
turn back on the light source in response to receipt of the indication.

11. The device of claim 7, wherein the processor is further configured to:
receive a light-source-default-setting command; and
turning the light source to a default state, wherein the light source when being at the default state includes different colors.

12. The UAV of claim 10, wherein the processor is further configured to:
receive a light-source-default-setting command; and
turning the light source to a default state, wherein the light source when being at the default state includes different colors.

13. The method of claim 1, wherein the turn-off-light command is based on lens flare of the light source.

* * * * *